(12) United States Patent
Dennes et al.

(10) Patent No.: US 8,620,803 B1
(45) Date of Patent: Dec. 31, 2013

(54) SYSTEMS AND METHODS FOR CUSTOMIZED ELECTRONIC FUNDS DISTRIBUTION

(75) Inventors: Jeff Dennes, San Antonio, TX (US); Randy Bear, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 827 days.

(21) Appl. No.: 11/828,899

(22) Filed: Jul. 26, 2007

(51) Int. Cl.
*G06Q 40/00* (2012.01)

(52) U.S. Cl.
USPC ............................................ 705/39; 705/35

(58) Field of Classification Search
USPC .................................................... 705/35, 39
See application file for complete search history.

(56) References Cited

U.S. PATENT DOCUMENTS

| | | | |
|---|---|---|---|
| 5,523,942 | A | 6/1996 | Tyler et al. |
| 6,868,391 | B1 | 3/2005 | Hultgren |
| 7,107,243 | B1 | 9/2006 | McDonald et al. |
| 2004/0039675 | A1 | 2/2004 | Wallman |
| 2004/0111372 | A1* | 6/2004 | Durbano ........................ 705/42 |
| 2005/0125165 | A1* | 6/2005 | Edmondson et al. ........... 702/40 |
| 2005/0125321 | A1* | 6/2005 | Gerstner et al. ................ 705/35 |
| 2005/0192899 | A1 | 9/2005 | Reardon |
| 2007/0294115 | A1 | 12/2007 | Loeb et al. |

OTHER PUBLICATIONS

"Subscriber's Savings Account", product brochure, USAA,(published prior to Jul. 26, 2007),2 p.
"Application for Refund of Accumulated Contributions to Member (PERS Form 5C)", [online]. Revised Mar. 2005, Public Employees' Retirement System of Mississippi, [retrieved Jul. 25, 2007]. Retrieved from the Internet: <URL: http://www.olemiss.edu/depts/HR/forms/persrefund/pdf>, 6 pgs.
"Application for Refund of Excess Contributions (RS 5195-I)", [online]. Revised Jul. 2004, Office of the New York State Comptroller. [retrieved Jul. 25, 2005 ]. Retrieved from the Internet: <URL: http://www.osc.state.ny.us/retire/forms/rs5195-i.pdf>, 4 pgs.
"Coverdell Education Savings Account Distribution Request Form (Coverdell ESA)", [online]. © 2004 E*Trade Financial. [retrieved Jul. 25, 2007]. Retrieved from the Internet: <URL: https://content.etrade.com/etrade/customer/invest/Education_IRA_Dist.pdf>, 2 pgs.
"Refund Fact Sheet for Deferred and Inactive Nonvested Members", [online]. Sep. 2005, SDCERA. [retrieved on Jul. 25, 2007]. Retrieved from the Internet: <URL: http://www.sdcera.org/PDF/refund_fact_sheet_2005.pdf>, 2 pgs.

* cited by examiner

*Primary Examiner* — Gregory Johnson
(74) *Attorney, Agent, or Firm* — Brooks, Cameron & Huebsch, PLLC

(57) ABSTRACT

Systems and methods for directing the transfer of funds are described. Funds to be distributed to a user are received by the system. User distribution preferences are read and the funds are distributed to various sources according to the preferences. Other embodiments are also described and claimed.

21 Claims, 6 Drawing Sheets

SYSTEMS AND METHODS FOR CUSTOMIZED ELECTRONIC FUNDS DISTRIBUTION

CROSS REFERENCES

This application is related to U.S. application titled "SYSTEMS AND METHODS FOR CUSTOMIZED ELECTRONIC FUNDS DISTRIBUTION" application Ser. No. 11/828,892, and to U.S. application titled "SYSTEMS AND METHODS FOR CUSTOMIZED ELECTRONIC FUNDS DISTRIBUTION" application Ser. No. 11/828,907, each of which is filed on even date herewith.

TECHNICAL FIELD

Various embodiments described herein relate to computer systems generally and more specifically to systems and methods for customized electronic funds distribution.

BACKGROUND

Some financial institutions, financial service companies or other businesses may employ methods for paying out or returning money to customers for a variety of reasons. Generally, the money to be returned to a customer is sent in the form of a check through the mail. At other times, money to be paid out to a customer may be directly deposited into an account. Some of these businesses may associate only one possible method of funds transfer to deal with a source of funds to be delivered to a customer.

SUMMARY

Systems and methods for directing the transfer of funds are described. Funds to be distributed to a user are received by the system. User distribution preferences are read and the funds are distributed to various sources according to the preferences. Other embodiments are also described.

DETAILED DESCRIPTION

The following detailed description is divided into four sections. The first section presents a system overview of the inventive subject matter. The second section provides methods of using example embodiments of the inventive subject matter. The third section describes example implementations. The fourth section describes the hardware and the operating environment in conjunction with which embodiments can be practiced.

System Level Overview

Figure 1:
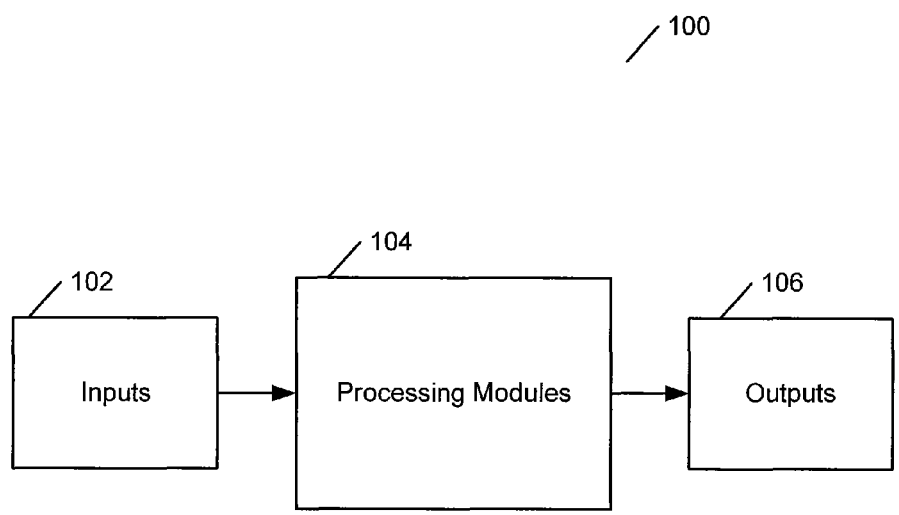
FIG. 1 is a block diagram of a customized electronic funds distribution system according to various embodiments.

FIG. 1 comprises a block diagram of a customized electronic funds distribution system 100 according to various embodiments. The system 100 includes inputs 102, processing modules 104 and outputs 106.

The inputs 102 in the system 100 may include monetary allotments to be delivered to a particular user. The user may be a customer of a financial institution, and may be receiving the monetary allotments for a number of reasons including refunds, reimbursements, dividends, claims payouts and others. These inputs 102 may originate at a financial institution and relate to financial accounts, insurance policies or the like. Other inputs 102 may include preferences set by the user to define the user's preferred distributions of any monetary allotments.

The processing modules 104 receive the inputs and process them to generate outputs 106. The processing modules 104 may receive one or more monetary allotments associated with a user, as well as the distribution preferences associated with that user. In accordance with the distribution preferences, the monetary allotments may be distributed in a number of ways as outputs 106 of the system 100.

The outputs 106 are the result of the processing modules 104 operating on the inputs 102 to the system 100. The outputs 106 may include deposits into financial accounts, payment of outstanding or future bills, a physical check sent to the user or other financial distributions.

Figure 2:
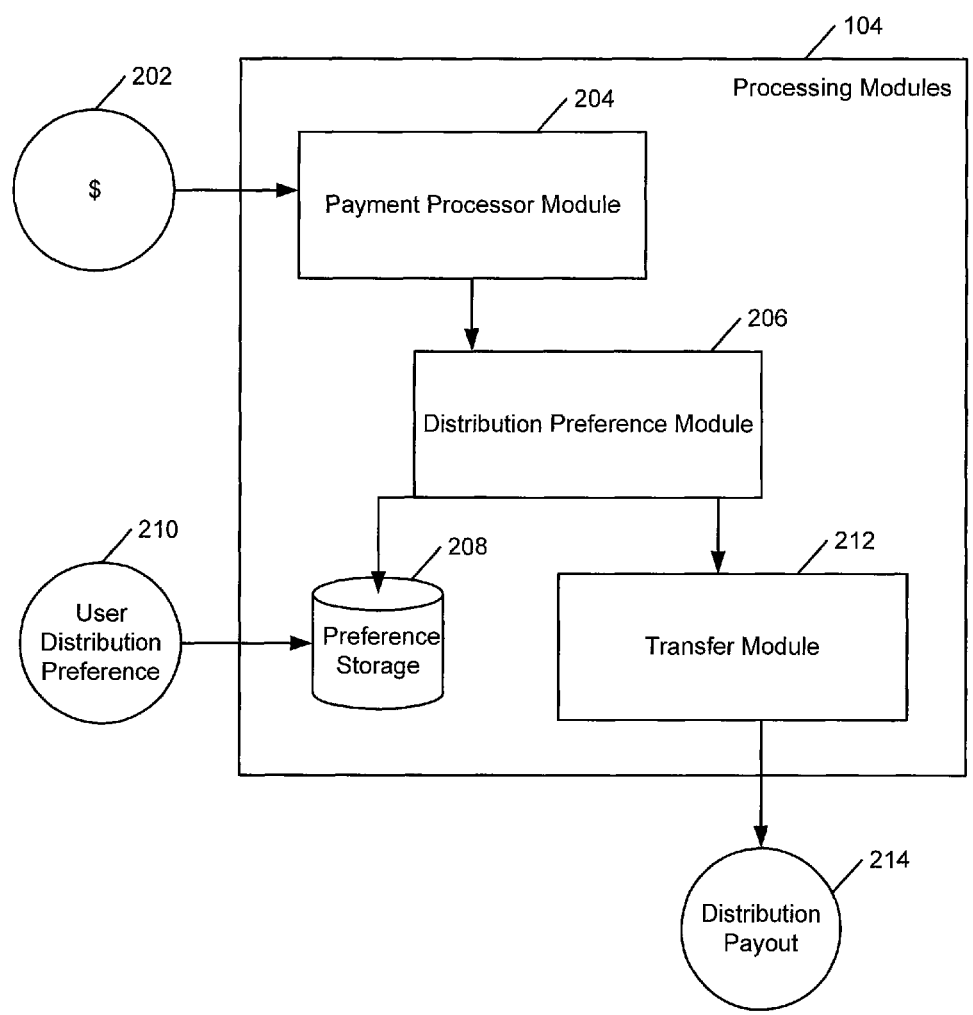
FIG. 2 is a block diagram of the processing modules of FIG. 1 according to various embodiments.

FIG. 2 comprises a block diagram of the processing modules 104 of FIG. 1 according to various embodiments. FIG. 2 includes monetary allotments 202, a payment processor module 204, a distribution preference module 206, a preference storage 208, user distribution preferences 210, a transfer module 212, and a distribution payout 214.

The monetary allotments 202 may be part of the inputs 102 as described with reference to FIG. 1. These monetary allotments 202 may include money in electronic or paper form to be transferred to a user. In order to organize and handle this transfer, a payment processor module 204 may be invoked. The payment processor module 204 may receive an instruction to distribute the monetary allotments 202 to the user. The distribution preference module 206 may be called by the payment processor module 204 in order to determine how the monetary allotment 202 should be distributed to the user.

The distribution preference module 206 may access the preference storage 208 to determine the user's custom preferences for distribution of any monetary allotments 202. The user may input the user distribution preferences 210 into the preference storage 208 via a online interface, through a phone call to a customer service representative, in person at a financial institution or other similar methods. Once the user distribution preferences 210 are retrieved from the preference storage 208, the distribution preference module 206 may generate distribution instructions for the transfer module 212.

The transfer module 212 may receive payment distribution instructions from the distribution preference module 206. The instructions may include information regarding how much money is to be distributed among one or more various sources. The sources may include internal financial accounts, external, third party financial accounts, pending or future bill payments, and a check to be sent to the user and others. The transfer module 212 may handle the actual distribution payout 214, or it may communicate with an Automated Clearing House (ACH) for handling of the distribution payout 214 according to the distribution instructions.

Methods

In this section, particular methods of example embodiments are described by reference to a series of flow charts.

The methods to be performed constitute computer programs made up of computer-executable instructions.

Figure 3:
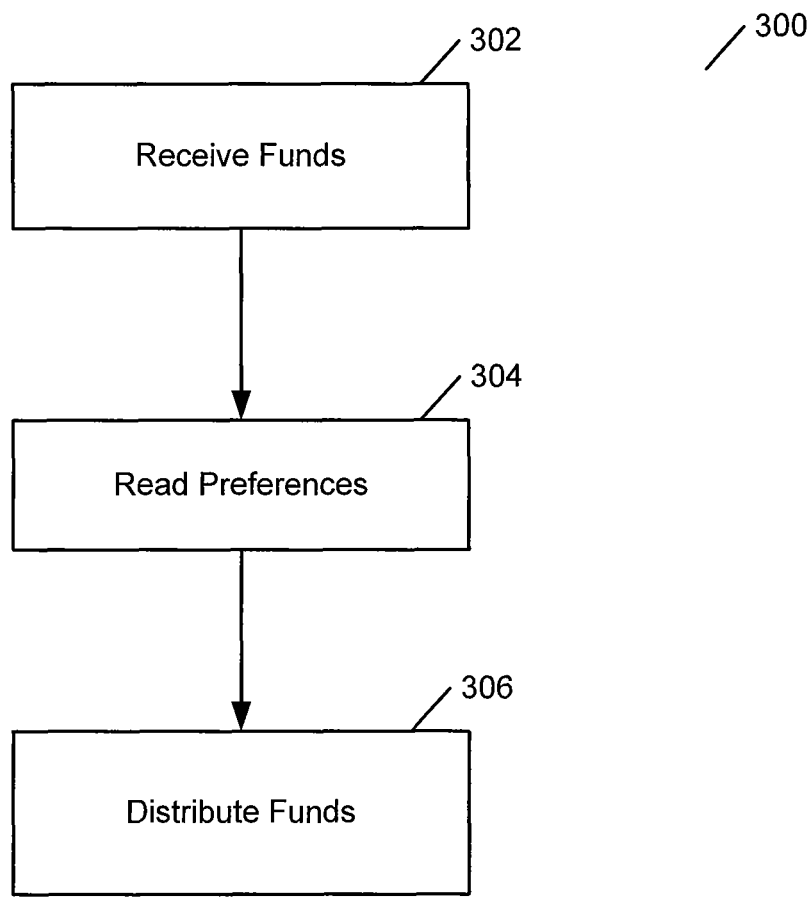
FIG. 3 is a flow diagram illustrating a method according to various embodiments.

FIG. 3 is a flow diagram illustrating a method 300 according to various embodiments. The method 300 begins by receiving funds at a processing system (block 302). The funds are to be distributed to a user. In order to determine how the funds are to be distributed, a set of preferences are read (block 304). These preferences may be pre-set by the user, or may be a default preference set. The default preference set may define a distribution to one or more default accounts, or may define a distribution based on a highest need model according to various embodiments. Based on the preferences read by the processing system, funds may be distributed accordingly (block 306). The distribution may take place in a number of ways. The funds may be distributed to the user as a check, to the user's financial accounts, to an ACH, to a bill payment service, or to other sources. The funds need not be only distributed directly to the user, the funds may be distributed to a third party's financial accounts, to a charity account, or another source on behalf of the user.

Figure 4:
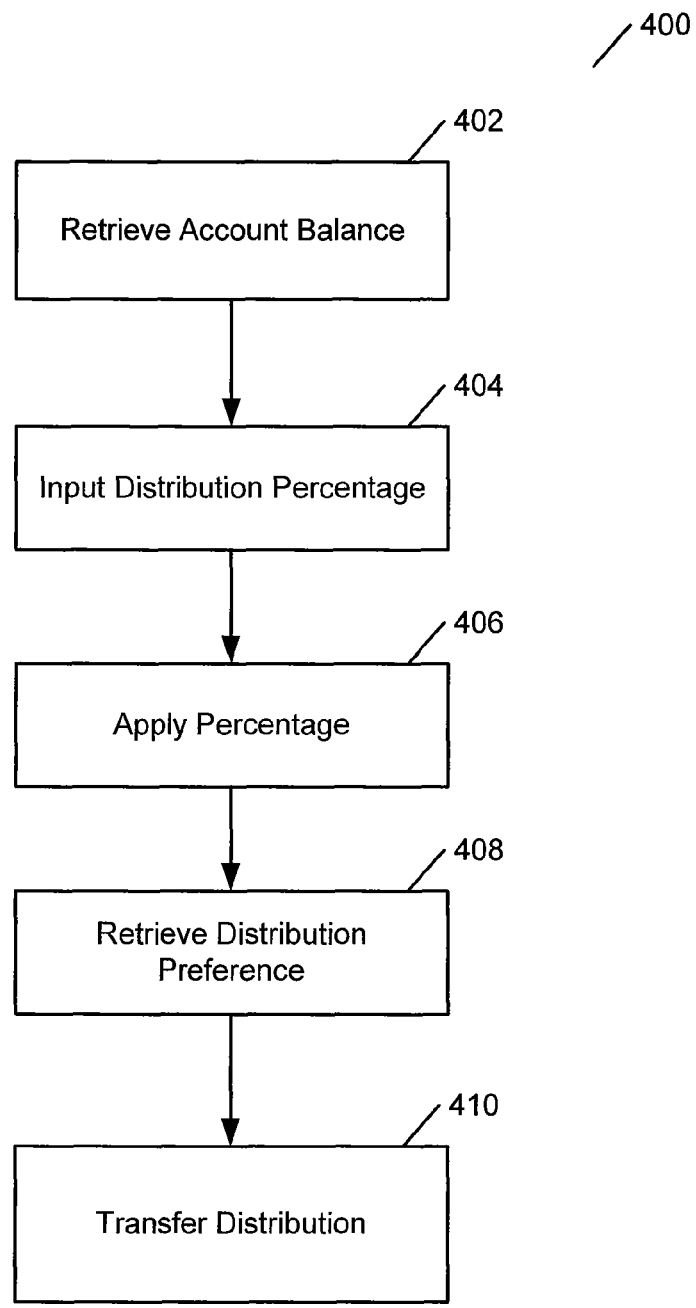
FIG. 4 is a more detailed flow diagram illustrating a subscriber account distribution method according to various embodiments.

FIG. 4 is a more detailed flow diagram illustrating a subscriber account distribution method according to some embodiments. The subscriber account distribution method 400 begins with the retrieval of an account balance associated with a particular user (block 402). According to various embodiments, the account may be a subscriber account which may be funded by a financial services company based at least in part on the performance of the financial services company over a period of time. As an example, according to some embodiments, a financial institution may make a profit in a particular year, and a portion of the profit may be allocated back to the customers or subscribers into subscriber accounts. The amount allocated per subscriber may be based not only on the profit of the financial institution, but also with regard to what kinds of accounts the user holds and how much the user has paid on premiums for services such as insurance. On a periodic basis, a decision may be made to release a portion of the balance of the subscriber accounts to the users holding the accounts. Based on profit margins, risk management calculations and other factors, a distribution percentage may be determined with which to apply to the balance of the subscriber accounts for release to the users. This distribution percentage is input into the system (block 404) and applied to the subscriber account to determine a dollar amount of money to be transferred to the user (block 406).

Each user may have a different preference for how to transfer the money coming out of the subscriber account. For this reason, each user may define a distribution preference to govern the transfer of the money. This distribution preference may be retrieved to allow the system to transfer money in accordance with the user's selection (block 410). The distribution may then be transferred by the system itself or by transmitting instructions to an ACH to make the appropriate distributions.

Example Implementations

Various examples of systems and methods for embodiments of the inventive subject matter have been described above.

Figure 5:
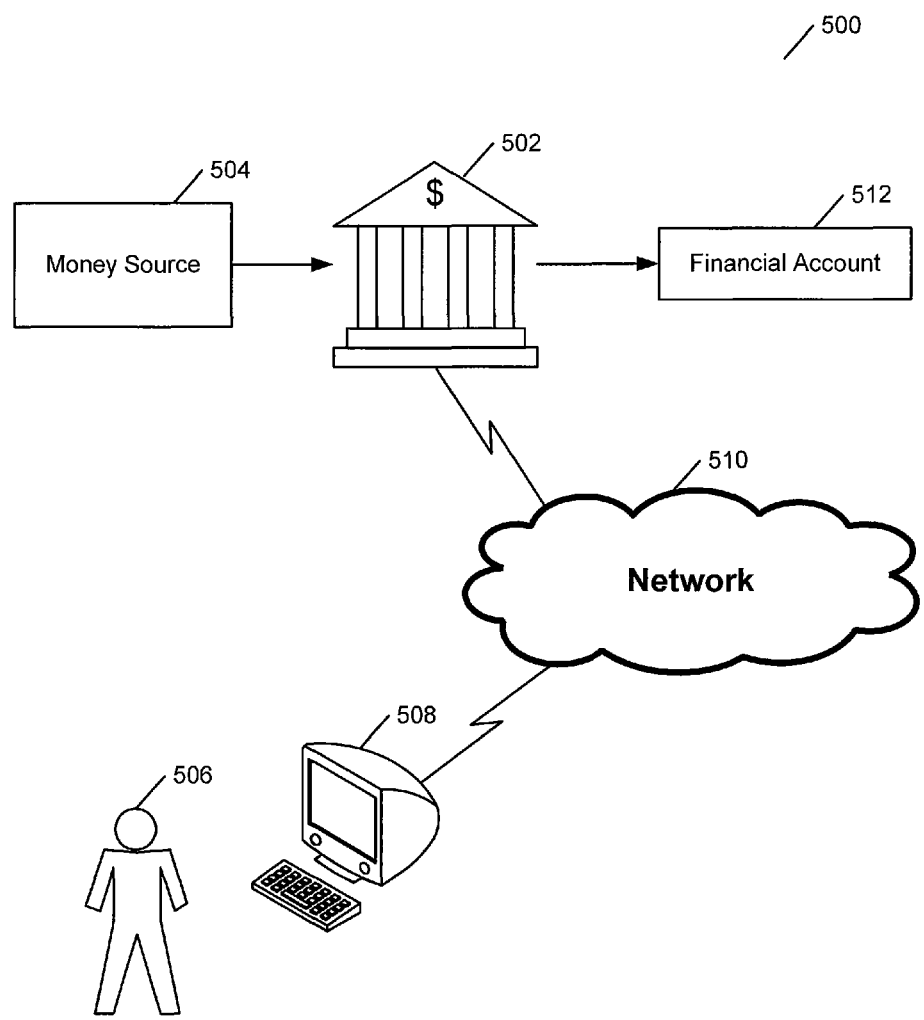
FIG. 5 is a diagram of an implementation of a customized electronic funds distribution system according to various embodiments.

FIG. 5 is a diagram of an implementation of a customized electronic funds distribution system 500 according to an example embodiment. The system 500 includes a financial services company 502, a money source 504, a user 506, a computer 508, a network 510, and a financial account 512.

The financial services company 502 may have as a customer the user 506. The money source 504 to be allocated to the user 506 may be operated or managed by the financial services company 502, or may be received at the financial services company 502 from a third party source. The money source 504 may originate from a single financial source or multiple financial sources. According to one embodiment, the money source 504 may be part of a subscriber account to reallocate profits to the user. According to other embodiments, the money source may include refunds, insurance claim payouts, credits or other like sources of money. In order to control how the money from the money source 504 is distributed, the user 506 may access a computer-based system to set preferences. The user may use a local or remote computer 508 connected to a network 510 to communicate with the financial services company 502. The network 510 may be a local network at the financial services company 502, accessed internally or remotely, or it may be a wide area network such as the internet. The interface may be web-based and may allow the user 506 to set and change distribution preferences. The distribution preferences may identify one or more financial accounts 512 for distribution of the money from the money source 504.

Hardware and Operating Environment

This section provides an overview of an example hardware and the operating environments in conjunction with which embodiments of the inventive subject matter can be implemented.

A software program may be launched from a computer-readable medium in a computer-based system to execute functions defined in the software program. Various programming languages may be employed to create software programs designed to implement and perform the methods disclosed herein. The programs may be structured in an object-orientated format using an object-oriented language such as Java or C++. Alternatively, the programs may be structured in a procedure-orientated format using a procedural language, such as assembly or C. The software components may communicate using a number of mechanisms well known to those skilled in the art, such as application program interfaces or inter-process communication techniques, including remote procedure calls. The teachings of various embodiments are not limited to any particular programming language or environment. Thus, other embodiments may be realized, as discussed regarding FIG. 6 below.

Figure 6:
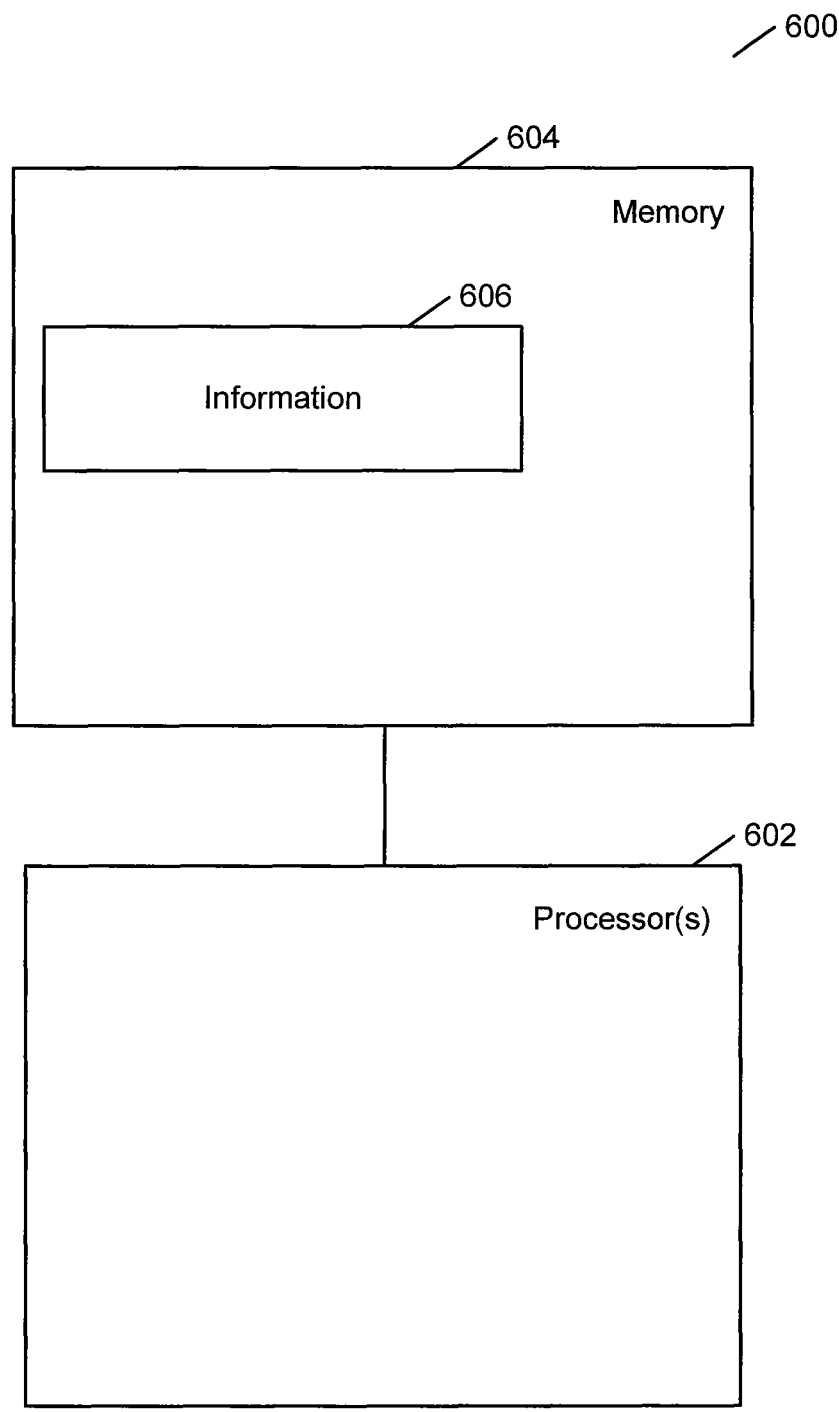
FIG. 6 is a block diagram of an article according to various embodiments.

FIG. 6 is a block diagram of an article 600 according to various embodiments. Such embodiments may comprise a computer, a memory system, a magnetic or optical disk, some other storage device, or any type of electronic device or system. The article 600 may include one or more processor(s) 602 coupled to a machine-accessible medium such as a memory 604 (e.g., a memory including electrical, optical, or electromagnetic elements). The medium may contain associated information 606 (e.g., computer program instructions, data, or both), which, when accessed, results in a machine (e.g., the processor(s) 602) performing the activities previously described herein.

Implementing the apparatus, systems, and methods disclosed herein may provide enhanced money distribution and management. The distribution of money to be allocated to a user may be customized according to personal preferences to provide simple and seamless transfer into specified accounts, or may be applied directly to bills or other payment devices.

Such embodiments of the inventive subject matter may be referred to herein individually or collectively by the term "invention" merely for convenience and without intending to voluntarily limit the scope of this application to any single invention or inventive concept, if more than one is in fact disclosed. Thus, although specific embodiments have been illustrated and described herein, any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

In the foregoing Detailed Description, various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate preferred embodiment.

It is emphasized that the Abstract is provided to comply with 37 C.F.R. §1.72(b) requiring an Abstract that will allow the reader to quickly ascertain the nature and gist of the technical disclosure. It is submitted with the understanding that it will not be used to interpret or limit the scope or meaning of the claims.

What is claimed is:

1. A computer implemented method for effecting a distributed transfer of funds, the method comprising:
   using a processor in a system including at least one subsystem having a computing device with the processor and memory for storing executable instructions that are executable by the processor to perform:
   determining an allocation amount, wherein the allocation amount is based upon profits of a financial services company, types of accounts held by a user with the financial services company, and payments by the user to the financial services company for services;
   providing the allocation amount to a profit reallocation account with the financial services company held by the user;
   determining a percentage of distribution, wherein the percentage of distribution is based on a profit margin of the financial services company and a risk management calculation;
   applying the percentage of distribution to the reallocation account and determining a monetary allotment;
   receiving an instruction to distribute the monetary allotment to the user;
   receiving the user's distribution preference for distributing funds from the profit reallocation account, wherein the user's distribution preference governs the transfer of money out of the profit reallocation account;
   generating distribution instructions based on the monetary allotment and the user's distribution preference; and
   effecting a funds transfer according to the distribution instructions.

2. The method of claim 1, further comprising maintaining one or more distribution preferences for the user to distribute funds from the reallocation account.

3. The method of claim 1, further comprising determining a funds transfer destination using a highest need model.

4. The method of claim 1, wherein effecting the funds transfer includes communicating the distribution instructions to an Automated Clearing House (ACH) engine for distribution.

5. The method of claim 1, wherein effecting the funds transfer includes transferring funds to an internal account of the financial services company, the internal account including at least one of the following: investment account, checking account, savings account, pending insurance bill, and credit account, all within the financial services company and held by the user.

6. The method of claim 1, wherein effecting the funds transfer includes transferring funds to a third party account.

7. The method of claim 1, wherein the monetary allotment represents a portion of the reallocation account.

8. An apparatus for effecting a distributed transfer of funds, the apparatus comprising:
   a computing device with a processor and memory for storing executable instructions that are executable by the processor to:
   determine an allocation amount, wherein the allocation amount is based upon profits of a financial services company, types of accounts held by a user with the financial services company, and payments by the user to the financial services company for services;
   provide the allocation amount to a profit reallocation account with the financial services company held by the user;
   determine a percentage of distribution, wherein the percentage of distribution is based on a profit margin of the financial services company and a risk management calculation;
   apply the percentage of distribution to the reallocation account and determine a monetary allotment;
   receive an instruction to distribute the monetary allotment to the user;
   receive the user's distribution preference for distributing funds from the profit reallocation account, wherein the user's distribution preference governs the transfer of money out of the profit reallocation account
   generate distribution instructions based on the monetary allotment and the user's distribution preference; and
   effect a funds transfer according to the distribution instructions.

9. The apparatus of claim 8, further comprising instructions that are executable by the processor to: maintain one or more distribution preferences for the user to distribute funds from the reallocation account.

10. The apparatus of claim 8, further comprising instructions that are executable by the processor to determine a funds transfer destination using a highest need model.

11. The apparatus of claim 8, wherein the instructions that are executable by the processor to effect the funds transfer include communicating the distribution instructions to an Automated Clearing House (ACH) engine for distribution.

12. The apparatus of claim 8, wherein the funds transfer is effected to an internal account of the financial services company, the internal account including at least one of the following: investment account, checking account, savings account, pending insurance bill, and credit account, all within the financial services company and held by the user.

13. The apparatus of claim 8, wherein the funds transfer is effected to a third party account.

14. The apparatus of claim 8, wherein the monetary allotment represents a portion of the reallocation account.

15. An article including a machine readable medium storing computer executable code, wherein the computer executable code instructs a machine to perform a method for effecting a distributed transfer of funds comprising:
   determining an allocation amount, wherein the allocation amount is based upon profits of a financial services company, types of accounts held by a user with the financial services company, and payments by the user to the financial services company for services;

providing the allocation amount to a profit reallocation account with the financial services company held by the user;

determining a percentage of distribution, wherein the percentage of distribution is based on a profit margin of the financial services company and a risk management calculation;

applying the percentage of distribution to the reallocation account and determining a monetary allotment;

receiving an instruction to distribute the monetary allotment to the user;

receiving the user's distribution preference for distributing funds from the profit reallocation account, wherein the user's distribution preference governs the transfer of money out of the profit reallocation account;

generating distribution instructions based on the monetary allotment and the user's distribution preference; and effecting a funds transfer according to the distribution instructions.

16. The article of claim 15, further comprising maintaining one or more distribution preferences for the user to distribute funds from the reallocation account.

17. The article of claim 15, further comprising determining a funds transfer destination using a highest need model.

18. The article of claim 15, wherein effecting the funds transfer includes communicating the distribution instructions to an Automated Clearing House (ACH) engine for distribution.

19. The article of claim 15, wherein effecting the funds transfer includes transferring funds to an internal account of the financial services company, the internal account including at least one of the following: investment account, checking account, savings account, pending insurance bill, and credit account, all within the financial services company and held by the user.

20. The article of claim 15, wherein effecting the funds transfer includes transferring funds to a third party account.

21. The article of claim 15, wherein the monetary allotment represents a portion of the reallocation account.

* * * * *